United States Patent [19]

Nakamura et al.

[11] Patent Number: 5,453,855
[45] Date of Patent: Sep. 26, 1995

[54] LIQUID CRYSTAL DISPLAY DEVICE BACKLIT BY LED'S COUPLED TO PRINTED CIRCUIT BOARD

[75] Inventors: Yasuo Nakamura; Etsuo Furuya, both of Shimizu, Japan

[73] Assignee: Koito Manufacturing Co., Ltd., Tokyo, Japan

[21] Appl. No.: 164,373

[22] Filed: Dec. 9, 1993

[30] Foreign Application Priority Data

Dec. 15, 1992 [JP] Japan .................. 4-0353718
Jun. 29, 1993 [JP] Japan .................. 5-40321 U
Sep. 7, 1993 [JP] Japan .................. 5-246233

[51] Int. Cl.⁶ .................. G02F 1/1335; G02F 1/1333
[52] U.S. Cl. .................. 359/49; 359/42; 359/48; 359/83
[58] Field of Search .................. 359/42, 48, 49, 359/83; 362/31, 26, 800

[56] References Cited

U.S. PATENT DOCUMENTS

4,791,540 12/1988 Dreyer, Jr. et al. .................. 362/331
5,064,276 11/1991 Endo et al. .................. 359/49
5,184,888 2/1993 Sakuma et al. .................. 362/136

*Primary Examiner*—Anita Pellman Gross
*Assistant Examiner*—Fetsum Abraham
*Attorney, Agent, or Firm*—Koda and Androlia

[57] ABSTRACT

A liquid crystal display device with an illuminator installed in the back of a liquid crystal display panel. The illuminator is made of a shallow box-form holder having a reflective inner surface, a plurality of LED's installed in at least one side wall of the holder, a light-diffusing plate installed between the liquid crystal display panel and the holder, and a printed circuit board mounted on the outer surface of the bottom of the holder. The LED's are of different light directional angles and inclined toward the bottom surface of the holder so that the light from the LED's can be reflected by the reflective bottom surface towards the display panel.

10 Claims, 7 Drawing Sheets

LIQUID CRYSTAL DISPLAY DEVICE BACKLIT BY LED'S COUPLED TO PRINTED CIRCUIT BOARD

BACKGROUND OF THE INVENTION

1. Field of the Invention

The present invention relates to a liquid crystal display device which is back-illuminated by means of LED's.

2. Prior Art

A liquid crystal display (LCD) device is used in various different types of devices and instruments such as OA (office automation) equipment, clocks, blood pressure gauges, hot water supply devices, etc. The display element (or display) is illuminated from the inside so that the visibility of the numbers, characters, etc. displayed thereon is improved.

In small battery-driven liquid crystal display devices, a reflective illumination method is generally employed so as to reduce power consumption. In this method, a light bulb (incandescent light bulb) is installed inside the LCD device, and the bulb is lit only when it required by the operator. The reason for this occasional use of the light bulb is that, though it depends on the capacity of the battery installed in the device, the power available is as small as 60 mW to 100 mW, and it is not possible to obtain a constant lighting by the light bulb.

Recently, therefore, illumination of the display is accomplished by a back-lighting system that uses LED's (light-emitting diodes) because they are low in power consumption.

LED's have a much smaller power consumption (20 mW per unit) than ordinary bulbs and also have a high brightness and a long useful life. In addition, LED's can emit various different colors of light such as green, yellow, etc. in addition to red; and they are easy to obtain. Accordingly, LED's are ideal for use as an illuminating light source in the liquid crystal display devices.

However, with LED's alone, it is difficult to illuminate a broad area of the display uniformly, since the directionality of the emission output of the LED's is high.

Figure 12:
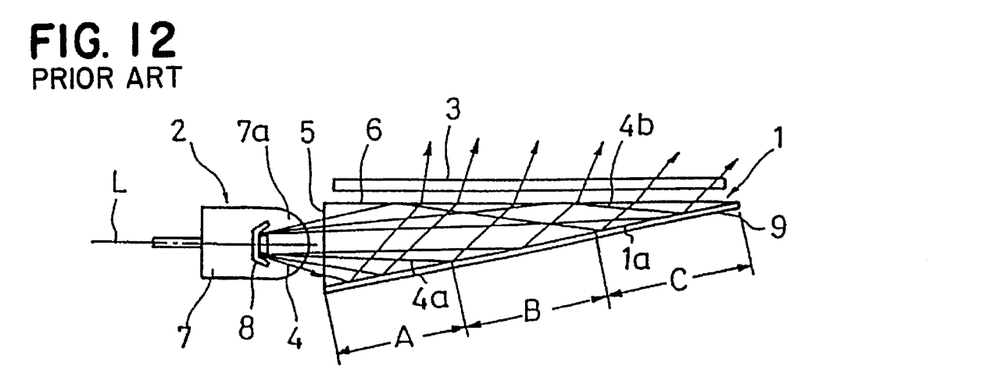
FIG. 12 illustrates a conventional flat panel type light-emitting body that uses a light-conducting plate and an LED.

Accordingly, as shown in FIG. 12, a flat panel type light-emitting body which is obtained from a light-conducting plate 1 and LED 2 is used as an illuminating device for a liquid crystal panel 3.

In this flat panel type light-emitting body, the light-conducting plate 1 is made of a transparent resin which is superior in terms of light transmissibility (e.g., an acrylic resin, etc.) and formed into a wedge shape when viewed from the side so that the back surface 1a of the light-conducting plate 1 is inclined. Light 4 emitted from the LED 2 enters into the interior of the light-conducting plate 1 from the thick end surface 5 and is then reflected at the back surface 1a of the light-conducting plate 1 so that light is emitted out from the top surface 6. Thus, a uniform surface illumination is obtained, and the entire surface of the liquid crystal display panel 3 is uniformly illuminated.

Compared to other flat panel type light-emitting bodies that use electroluminescence, optical fibers, etc., this flat panel type light-emitting body has advantages. It is simple in structure and low in the manufacturing cost.

Since the LED 2 has a small light emission area, a diode chip 8 is molded in a transparent resin 7 such as an acrylic resin, etc. so that the light emitted from the diode chip 8 is spread by a convex lens part 7a formed at the tip of the transparent resin 7. With this structure, the light is easier to see.

In the above light-conducting plate 1, the inclined back surface 1a forms a reflective surface 9 which is obtained by the vacuum evaporation of aluminum or bonding of a reflective sheet, etc..

However, the following problem arises in the conventional liquid crystal display devices that use a light-conducting plate 1 and LED 2. Brightness irregularity tends to occur; and as a result, the entire display of the liquid crystal display panel 3 is not uniformly illuminated.

More specifically, the LED 2 is installed so that its optical axis L is roughly parallel to the surface 6 of the light-conducting plate 1. A portion 4a of the light entering the light-conducting plate 1 from the LED 2 is reflected by the reflective surface 9 and is emitted to the outside from the surface 6 (this light is called directly reflected light), while another portion 4b of the light is first completely reflected by the surface 6 of the light-conducting plate 1 and then reflected by the reflective surface 9 and emitted from the surface 6 (this light is called completely reflected light). Accordingly, if the reflective surface 9 is divided into, for example, three areas A, B and C along the direction of the optical axis (the area closest to the LED 2 is A, the next closest area B, and the area furthest from the LED 2 C), the quantities of directly reflected light 4a and the completely reflected light 4b per unit area vary depending upon the area involved. As a result, brightness irregularity occurs. The areas A and C are brighter, and the area B is darker.

In compact liquid crystal display devices, the manufacturing cost, brightness, size and weight are critical, and devices which are low in manufacturing cost, size and weight and which provide a uniformly bright illumination in strong demand. However, in the devices which use the light-conducting plate as described above, the weight tends to be large because of the light-conducting plate. Thus, there are limitations to the weight reduction.

SUMMARY OF THE INVENTION

The present invention is to solve the problems in the conventional devices.

The primary object of the present invention is to provide a liquid crystal display device which can achieve a reduction in weight and thickness, produce no irregularity in brightness and provide uniform and brighter surface illumination, and is designed so that various areas to be illuminated can be illuminated with a desired color at a desired brightness.

The liquid crystal display device according to the present invention is comprised of a holder with its front surface open, a liquid crystal display panel installed in the front-surface opening of the holder with a light-diffusing plate interposed between the holder and the panel, a printed circuit board attached to the back of the holder, and a plurality of LED's mounted on the printed circuit board so as to back-illuminate the liquid crystal display panel from behind the light-diffusing plate, and in addition, the holder is provided with LED mounts which hold the LED's, and the inside bottom surface of the holder is formed with a reflective surface so that the light-diffusing plate is back-illuminated by direct light emitted from the LED's and reflected by the reflective surface.

In the liquid crystal display device of the present invention, two types of LED's which differ in light directional angles are employed.

In addition, the liquid crystal display device of the present invention uses two types of LED's which emit different colors of light.

Furthermore, in the liquid crystal display device of the present invention, at least one LED mount is provided with a plurality of through-holes which are formed so that the respective axial lines of the through-holes are inclined toward the light-diffusing plate or toward the reflective surface.

The reflective surface which is on the bottom of the liquid crystal display device of the present invention is raised at the center for accomplishing a higher effective back-illumination.

In the present invention, the inside bottom surface of the holder forms the reflective surface, so that a portion of the light emitted from the LED's is reflected to the front, and the light-diffusing plate diffuses the light from the LED's so that the flickering of the light in a specified direction is eliminated. The LED's are positioned at inclined angles in the through-holes of the holder so that the optical axes of the LED's intersect portions of the holder. As a result, the proportions of the light reflected by the reflective surface and the light directed toward the light-diffusing plate are changed. Accordingly, the quantities of reflected light that are reflected in the respective areas of the reflective surface are also can vary.

Generally, LED's with a narrow directional angle are brighter than LED's with a broad directional angle. Thus, in the present invention, LED's with a narrow directional angle are used for the areas where the brightness is low so that the brightness of the overall illumination area is adjusted so as to be uniform.

DETAILED DESCRIPTION OF THE INVENTION

The present invention will be described in detail below with reference to the Figures in the accompanying drawings. In these Figures, the same elements to those in FIG. 12 are indicated by the same reference numerals.

FIG. 1 through FIG. 4 show a first embodiment of the present invention.

Figure 1:
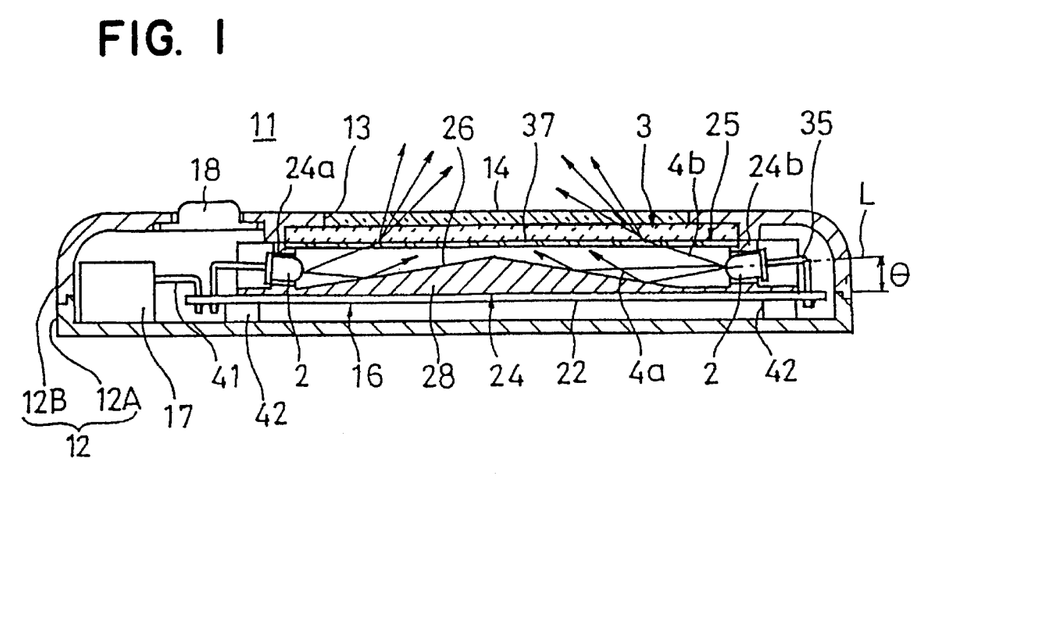
FIG. 1 shows a cross section of a first embodiment of the liquid crystal display device according to the present invention.

The liquid crystal display device 11 includes a case 12 which is formed as a thin rectangular frame with an opening 13 in the center. The case 12 is obtained form two casing elements: front and back (or upper and lower in the Figures) casing element. These casing elements are made by injection molding of a resin, so that the case 12 consists of a main casing 12A (lower casing) and a cover casing 12B (upper casing) which fits into the opening of the main casing 12A. The cover casing 12B is connected to the main casing 12A by a conventional means such as fastening screws, elastic engagement means, etc. (not shown in the Figures).

Inside the case 12 is provided a liquid crystal display panel 3, an illuminating device 16 which includes a plurality of LED's 2 so as to back-illuminate the liquid crystal display panel 3, and a power supply 17 for the LED's 2 and liquid crystal display panel 3. A plurality of operating switches 18, etc. are provided on the front (or upper) surface of the cover casing 12B.

The opening 13 is at the center of the front (or upper) cover casing 12B, and a protective plate 14 which protects the surface of the liquid crystal display panel 3 is fitted in this opening 13.

The liquid crystal display panel 3 is a conventional one and is made of a nematic liquid crystal, etc. which is installed between upper and lower glass plates. The liquid crystal display panel 3 is formed as a thin rectangular plate with a plurality of terminals 20 (see FIG. 2) installed on the two longer side surfaces that are parallel to the direction of the length of the display panel 3. These terminals 20 are connected to a conventional liquid crystal driving circuit (not shown) of a printed circuit board 22 by lead wires 21. The lead wires 21 are bent roughly at right angles toward the back of the liquid crystal display panel 3 along the side surfaces of the liquid crystal display panel 3. The rear (or distal) ends of the lead wires 21 are inserted into holes 23 of the printed circuit board 22 and electrically connected to the liquid crystal driving circuit by soldering.

The illuminating device 16 includes a shallow box-form holder 24 which is parallel to the liquid crystal display panel 3 on the back (lower) side of the display panel 3, a plurality of LED's 2 which are installed in the side walls 24a and 24b of the holder 24, the printed circuit board 22 to which the holder 24 is attached, and a light-diffusing plate 25 installed between the liquid crystal display panel 3 and the holder 24.

The holder 24 is made of a synthetic resin. The front surface (or the top surface in the Figures) of the holder 24 is open. In other words, the holder is open toward the front (or the top), and the entire inside surface is reflection-treated which is obtained by an application of a white paint, a bonding of an aluminum foil, vacuum evaporation of aluminum, etc. A reflective surface 26 is thus formed in the holder 24. If necessary, fine projections and indentations can be formed on the reflective surface 26 so that a diffusing type reflective surface is obtained.

Figure 2:
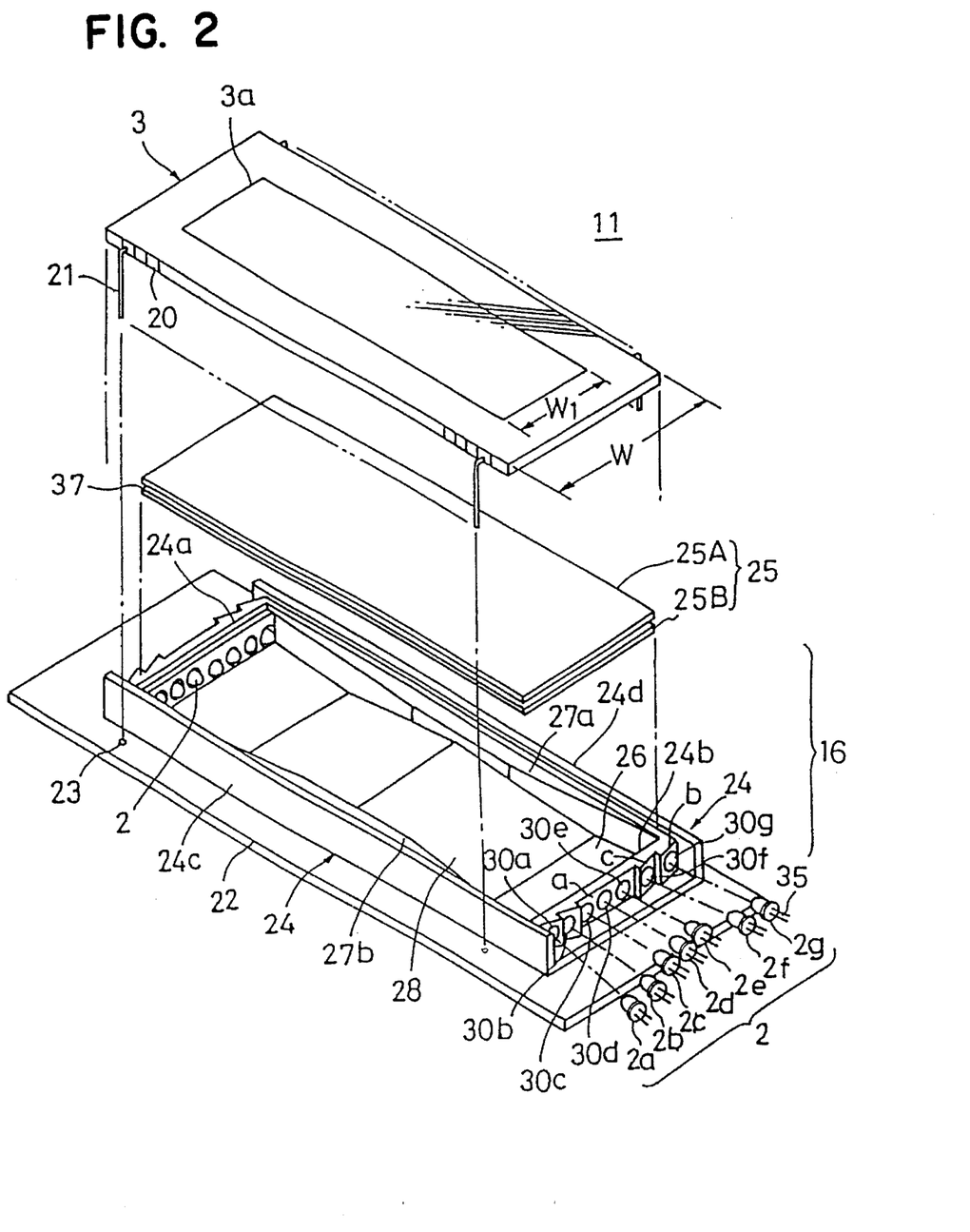
FIG. 2 is an exploded perspective view of the main section of the device of FIG. 1.

As seen in FIG. 2, a pair of trapezoidal projections 27a and 27b are installed so as to face each other on the inside surfaces of the longer side walls 24c and 24d of the holder 24. Thus, the minimum width at the central part of the holder 24 is roughly equal to or slightly larger than the width W1 of the display part 3a of the liquid crystal display panel 3, and the maximum width at both ends of the holder 24 (in the direction of length) is roughly equal to or slightly smaller than the width W of the liquid crystal display panel 3.

Height-wise, the trapezoidal projections 27a and 27b are shorter than the side walls 24c and 24d by an amount of the combined thicknesses of the liquid crystal display panel 3 and light-diffusing plate 25. Thus, the liquid crystal display panel 3 and light-diffusing plate 25 can be fitted in the front-surface (or upper surface) opening of the holder 24 with the outer edges of the light-diffusing plate 25 rested on the front (or upper) surfaces of the trapezoidal projects 27a and 27b.

A hill-shaped raised portion 28 is formed as an integral part of the holder 24 at the center of the inside bottom surface of the holder 24. As described above, the surface of this raised portion 28 is a reflective surface that is provided in a conventional means such as by the application of a white paint, bonding of an aluminum foil, or vacuum evaporation of aluminum, etc.

In each of the shorter side walls 24a and 24b of the holder 24, a plurality of through-holes 30 (seven through-holes 30a through 30g in this embodiment) for LED's 2 are formed in a row at a prescribed spacing. The LED's 2a through 2g are respectively installed in these through-holes 30. The through-holes 30 are formed at an inclined angle so that the axial lines of the through-holes 30 intersect the front (or upper) surface opening of the holder 24 at a shallow angle θ with respect to a horizontal line h. Thus, the through-holes 30 are inclined toward the reflective surface 26 of the holder 24. In other words, the outside opening ends of the through-holes 30 are positioned closer to the front (or upper) surface opening of the holder 24 than the inside opening ends of the through-holes 30. The angle of inclination θ of the through-holes 30 in this case is approximately 4.5 degrees.

Figure 3:
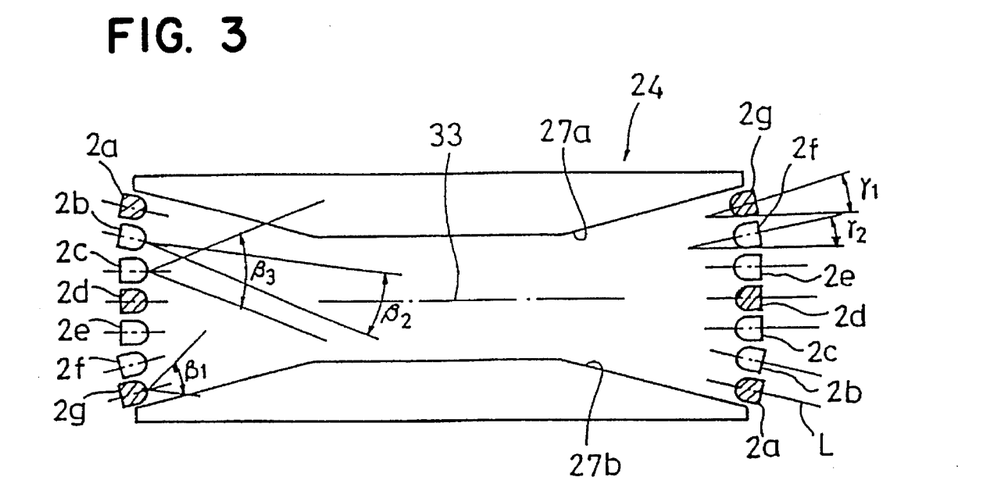
FIG. 3 is a top view of the arrangement of the LED's used in the device of FIG. 1.

As shown in FIG. 3, out of the seven through-holes, the three through-holes 30c through 30e which are located in the center are formed so that their axial lines are parallel to the imaginary center line 33. The through-holes 30a and 30g located at both ends are inclined by an angle γ1 (which is 10 degrees) with respect to the center line 33, so that the imaginary extension lines of the optical axes of the through-holes 30a and 30g intersect the center line 33 roughly at the center of the holder 24. The remaining two through-holes 30b and 30f are inclined by an angle γ2 (which is 7 degrees) with respect to the center line 33 so that the imaginary extension lines of the optical axes of the through-holes 30b and 30f point roughly toward the center of the holder 24.

Figure 4:
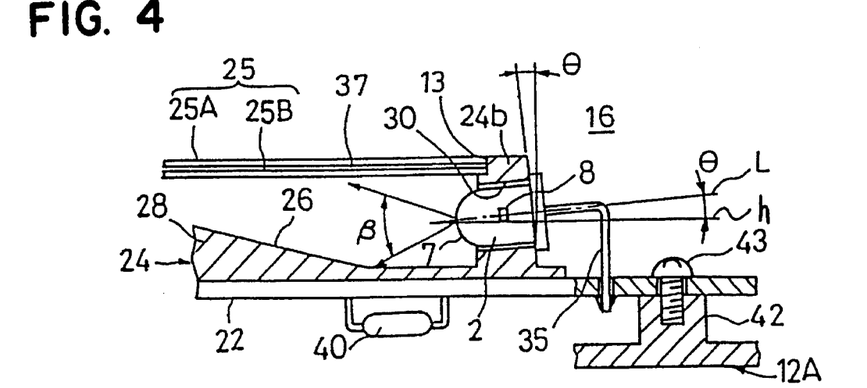
FIG. 4 shows an enlarged cross section of the essential section of the device.

As shown in FIG. 4, the outside surfaces of the respective shorter side walls 24a and 24b are inclined inwardly by an angle θ which is equal to the angle of the inclination angle θ of the LED's 2. In addition, as seen from FIG. 2, the center a of the outside surface of each side wall 24a and 24b for the three through-holes 30c through 30e is formed flat so as to be perpendicular to the axial lines of the through-holes 30c through 30e. The end portions b at both ends of the side wall for the through-holes 30a and 30g are formed, are formed as inclined surfaces which are perpendicular to the axial lines of the through-holes 30a and 30g and inclined by an angle γ1 with respect to the center a. The middle portions c for the through-holes 30b and 30f are formed as inclined surfaces which are perpendicular to the axial lines of the through-holes 30b and 30f and inclined by the angle γ2 with respect to the center a.

These angled surfaces are provided in order to insure stable and secure attachment of the LED's 2 in the through holes 30a–30g. When the LED's 2 are installed in the respective through-holes 30a through 30g, the optical axes L of the LED's 2 are aligned with the center lines of the through-holes 30a through 30g.

The LED's 2a through 2g have different light directional angles (spread angles) β as seen from FIGS. 3 and 4.

In this embodiment, the directional angle β1 (see FIG. 3) of the LED's 2a, 2d and 2g positioned at both ends and in the center is 34 degrees, the directional angle β2 of the LED's 2b and 2f which are the second LED's from the respective ends is 12 degrees, and the directional angle β3 of the LED's 2c and 2e which are the third LED's from the respective ends is 40 degrees.

The different directional angles β is obtained by differentiating the distance between the tip lens part of the transparent resin 7 (see FIG. 4) and the diode chip 8 at the time of molding. The directional angle β can be large when the diode chip 8 is positioned closer to the lens part of the resin 7 and small when the diode chip 8 is positioned further away from the lens part.

In addition, the LED's 2 that emit different colors of light are used. In this embodiment, LED's of two different colors are employed. More specifically, the LED's 2b, 2c, 2e and 2f, which are the second and third LED's from the respective ends, emit green light; and the remaining LED's 2a, 2d and 2g located at both ends and in the center indicated by shading in FIG. 3 emit red light.

These LED's 2 are connected to the electrical circuitry of the printed circuit board 22 by lead wires 35. The electric circuit is constructed so that only the green LED's 2b, 2c, 2e and 2f light up under normal usage via the operation of the operating switches 18 (see FIG. 1) so that the display part 3a of the liquid crystal display panel 3 is back-illuminated by these LED's. The red LED's 2a, 2d and 2g are used only as a warning display. Thus, variety of the illumination is obtained by using LED's of different colors.

As best shown in FIG. 4, the light-diffusing plate 25 is made of two diffusing films 25A and 25B which are installed one in front (or top) of the other with an appropriate empty space in between and installed in the opening 13 of the holder 24. The empty space between the two films 25A and 25B is in fact an air layer 37 which is for increasing the diffusing effect.

The front (or top) diffusing film 25A is obtained by, for example, applying an opacifier to an acrylic resin. The back (or lower) diffusing film 25B is obtained by, for example, subjecting the surface of a polyester film to a light-diffusing treatment by means of sand blasting.

Other types of diffusing films 25 can be used, such as films formed by subjecting the surface of a transparent resin to a light-diffusing treatment based on embossing or an application of a transparent paint containing minute glass beads, metal particles, etc. Films formed from a transparent resin molded with minute metal particles added to the resin at the time of molding can be also used. The size of the space between the diffusing films 25A and 25B is set at an optimal value with a consideration of the light loss caused by the air layer 37.

The printed circuit board 22 has a liquid crystal driving circuit and a constant-current circuit. The driving circuit contains various electronic components 40 (see FIG. 4) such as liquid crystal driving IC's, transistors and resistors, etc. The constant-current circuit is used for the LED's 2.

The printed circuit board 22 is electrically connected to the power supply 17 as seen in FIG. 1 by lead wires 41. The constant-current circuit compensates for the temperature of the LED's 2. More specifically, when the diode voltage changes as a result of change in temperature, the current changes because the power supply voltage is fixed, and also the brightness of the LED's 2 changes. In order to prevent these changes, field-effect transistors (FET's) are connected in series with the LED's 2. This is especially effective in cases where the diode voltage is as low for example as 3 V, 4.5 V or 6 V.

The printed circuit board 22 is attached by screws 43 to a board-attachment 42 which project from the bottom of the main casing 12A.

In the liquid crystal display device 11 as described above, the LED's 2 2b, 2c, 2e and 2f which emit green light are lit during ordinary operation. A portion of the light emitted from these LED's 2 directly hits the inside bottom surface of the holder 24 or the reflective surface 26 and is completely reflected to the front (or upward), thus forming the directly reflected light 4a. Another portion of the light emitted from the LED's 2 is directed toward the front of the holder 24, thus forming the directly emitted light 4b. These two types of light 4a and 4b are diffused when they pass through the light-diffusing plate 25 and air layer 37; and as a result, the entire display part 3a of the liquid crystal display panel 3 is back-illuminated or illuminated from behind. Thus, the illuminating device 16 makes a plane light source.

The light-diffusing plate 25 and the air layer 37 prevent flickering of the light in a specified direction by diffusing the light from the LED's 2. Since the holder 24 is a shallow box shape, the weight is smaller compared to the devices that use light-conducting plates.

The LED's 2 are installed so that they are inclined by a prescribed angle θ toward the inside of the holder 24 or toward the reflective surface 26. The quantity of the light reflected by the reflective surface 26 of the holder 24, particularly the quantity of the reflected light 4a reflected near the foot areas of the raised portion 28 (see FIG. 1) and directed forward (or upward), is increased compared to a case where the LED's 2 are not installed in a inclined fashion. Accordingly, the brightness of the central part of the holder 24 with respect to the direction of the length (or the direction of the longer sides 24c and 24d) of the holder 24 is increased.

Furthermore, LED's 2 of different directional angles β are used so that the lengthwise central area of the holder 24, where the brightness tends to be low, is illuminated by the bright light from the LED's 2c and 2e which have a small directional angle β3. Thus, a more uniform surface illumination which is free of irregularity is obtained.

The light emitted from the LED's 2 can be precisely controlled by changing the installation arrangement of the LED's 2 and using LED's of different directional angles β. The brightness levels in the respective illumination areas can be thus adjusted so as to meet the intended brightness levels.

Figure 5:
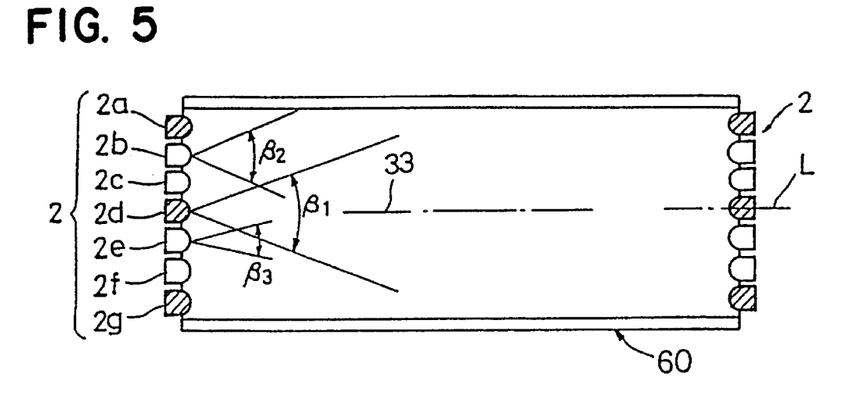
FIG. 5 is a top view illustrating the arrangement of LED's in a second embodiment of the present invention.
Figure 6:
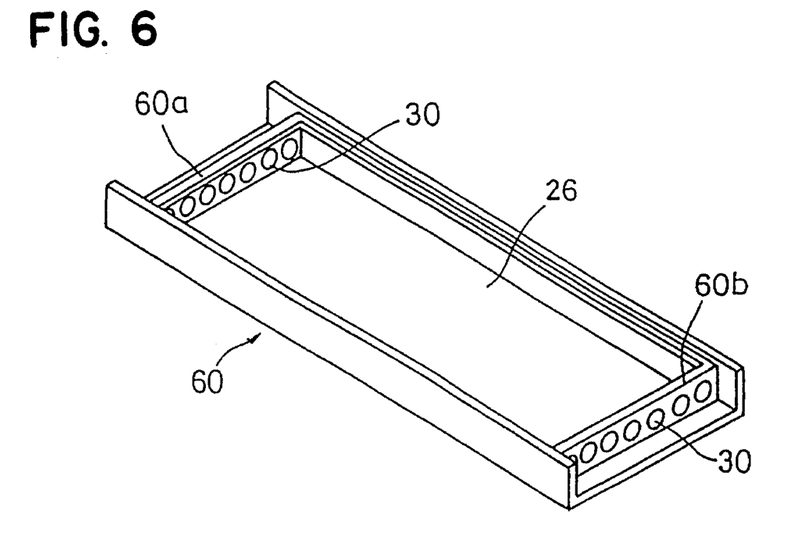
FIG. 6 is an perspective view of the holder of the second embodiment.
Figure 7:
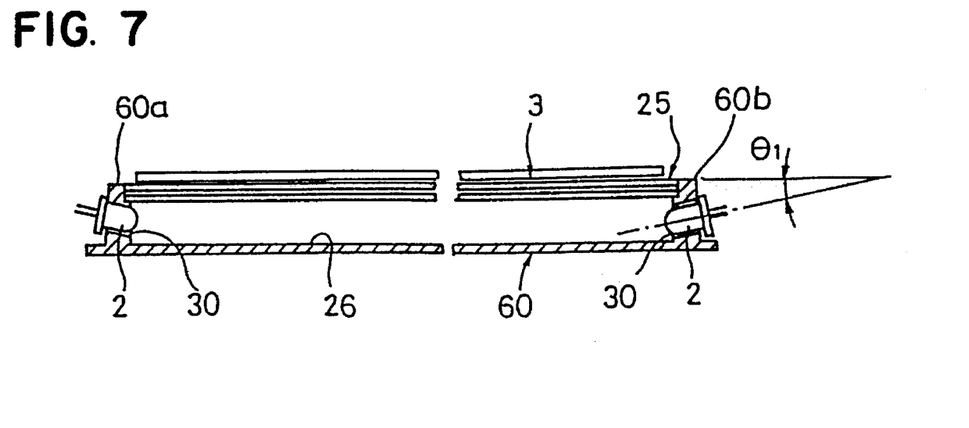
FIG. 7 is a cross section of the holder of the second embodiment.

FIGS. 5, 6 and 7 illustrate a second embodiment of the present invention.

In this embodiment, the inside dimensions of the holder 60 are the same throughout the entire length of the holder, and the bottom is formed flat. In other words, unlike the first embodiment, the holder has no trapezoidal projections nor hill-shaped raised portion inside.

In the second embodiment, a plurality of through-holes 30 which are formed in the shorter side walls 60a and 60b of the holder 60 are inclined toward the bottom of the holder 60 by an angle of θ1 (which is 6 degrees) as in FIG. 7. The axial line of each hole 30 is parallel to the center line 33 of the holder 60. The bottom of the holder 60 is a reflective surface 26 which is obtained by the application of a white paint, the bonding of an aluminum foil, the vacuum evaporation of aluminum foil, the vacuum evaporation of aluminum, etc.

The LED's 2a, 2d and 2g which are provided at both ends and in the center of each one of the shorter side walls 60a and 60b of the holder 60 emit red light, and the directional angle β1 of these LED's is 34 degrees. The LED's 2b and 2f which are second from the respective ends emit green light, and the directional angle β2 of these LED's is 40 degrees. The LED's 2c and 2e which are third from the respective ends emit green light, and the directional angle β3 of these LED's is 40 degrees.

Otherwise, this embodiment is generally the same as the first embodiment in structure.

In this embodiment either, the LED's 2 are inclined toward the inside of the holder 60 and are of different directional angles β. Accordingly, as in the first embodiment, uniform surface illumination is obtained, and the entire display part of the liquid crystal display panel 3 is uniformly illuminated.

Figure 8:
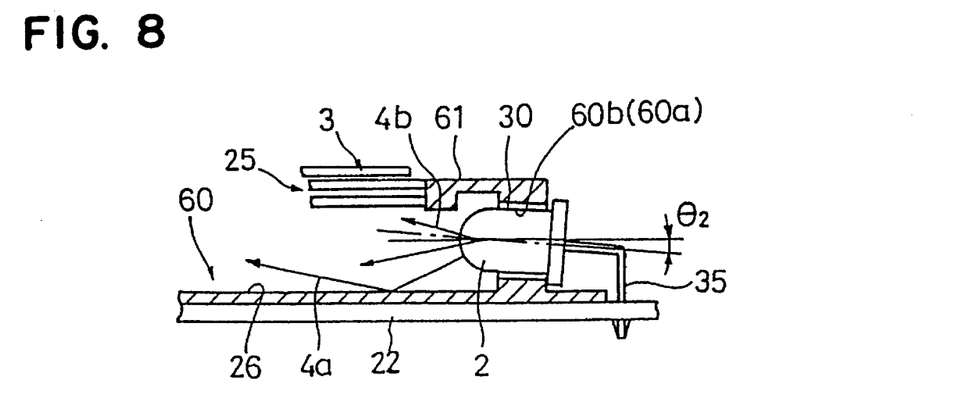
FIG. 8 shows an enlarged cross section of the essential section of a third embodiment of the present invention.

FIG. 8 shows a third embodiment of the present invention.

In this embodiment, a shade 61 which is used for glare prevention is provided so as to project, as an integral part, from the inner end of each shorter side walls 60a and 60b of the holder 60. Unlike the first and second embodiments, the through-holes 30 are formed so that they are inclined toward the light-diffusing plate 25 or upwardly. Accordingly, the LED's 2 in the through-holes 30 are inclined toward the front (or upward) of the holder 60 by a prescribed angle θ2 (which is 4.5 to 6 degrees).

Otherwise, this embodiment is substantially the same as the previous embodiments structure-wise.

In the structure of this third embodiment, the directly emitted light 4b directed toward the front (or top) of the holder 60 is increased, and the directly reflected light 4a which is reflected by the reflective surface 26 can travel a greater distance. Accordingly, the brightness of illumination areas which are distant from the LED's 2 can be increased. In addition, since the shades 61 are provided between the LED's 2 and the light-diffusing plate 25, the LED's 2 do not enter the field of vision through the liquid crystal display panel 3. Thus, the visibility is improved. The other advantages of this embodiment are the same as those of the first embodiment.

Figure 9:
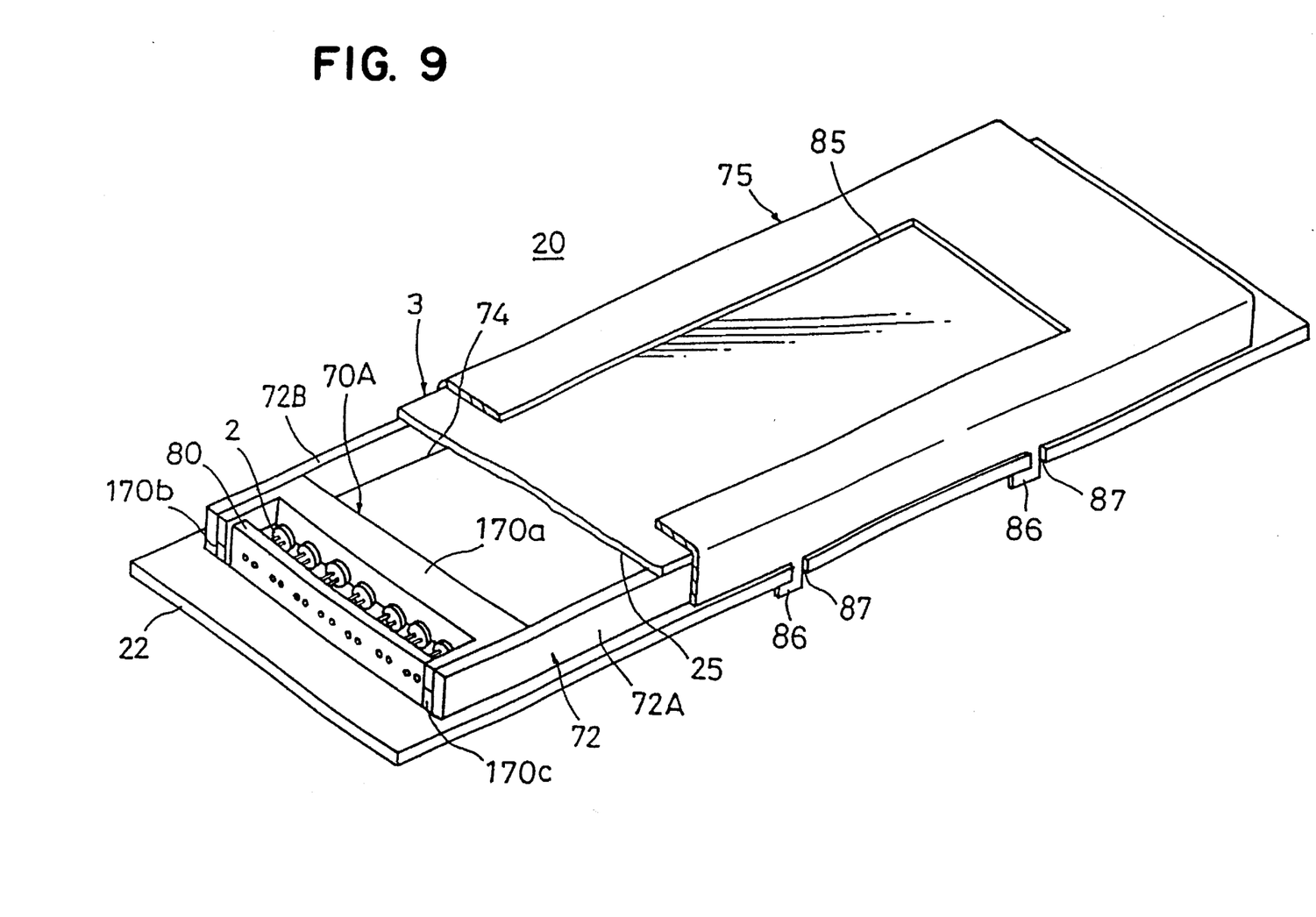
FIG. 9 is a partially cross-sectional perspective view of a fourth embodiment of the present invention.
Figure 10:
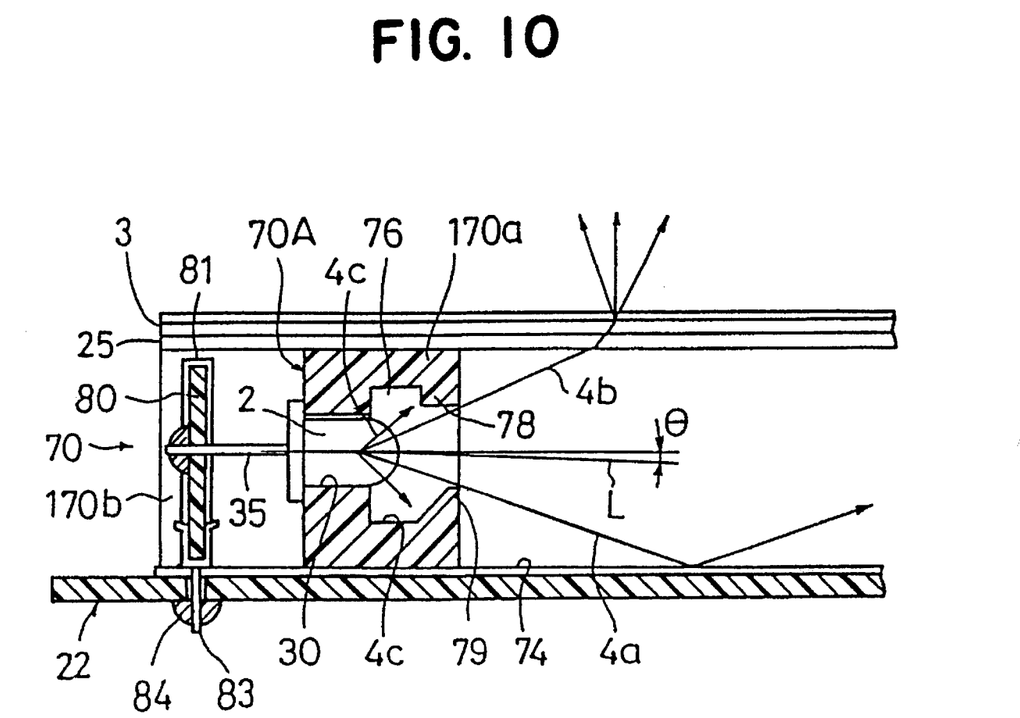
FIG. 10 shows an enlarged cross section of the essential section of the device of the fourth embodiment.

FIGS. 9 and 10 illustrate a fourth embodiment of the present invention.

In this embodiment, a pair of holder blocks 70A (only one is shown) are used as the shorter sides of the rectangular holder 70, and a pair of conductive elements 72A and 72 which are made of a conductive rubber, etc. are used as the longer sides of the holder 70. The liquid crystal display panel 3 is provided on the thus obtained holder 70, and the holder 70 is mounted on a printed circuit board 22 with a reflection plate 74 in between. The side and peripheral portion of the front (or upper) surfaces of the liquid crystal display panel 3 are covered by a casing 75.

The liquid crystal display panel 3 is installed on the holder 70 with a light-diffusing plate 25 in between. A plurality of liquid crystal driving electrodes (not shown) are installed on the front (or upper) surfaces of the holder blocks 70A and the conductive elements 72A and 72B and also along the side edges of the back (or bottom) surface of the liquid crystal display panel 3. These driving electrode are electrically connected to a liquid crystal driving circuit (not shown) of the printed circuit board 22 via the conductive elements 72A and 72B.

Each of the holder blocks 70A is formed by the injection molding of a resin, so that it is a squared-off "C" shape when viewed from the above. Each holder block 70A consists of a main body part 170a and a pair of board-holding parts 170b and 170c. The main body part 170a is long in the perpendicular direction relative to the length of the liquid crystal display panel 3, and the board-holding parts 170b and 170c are provided at both ends of the main body part 170a, thus forming the "C".

As shown in FIG. 10, the cross-section of each main body part 170a in the direction parallel to the direction of the length of the liquid crystal display panel 3 is a C shape. Thus, each main body part 170a has a recessed area 76 which opens on the inside surface of the main body part 170a. Furthermore, seven through-holes 30 are formed in each main body part 170a at a prescribed spacing along the length of the main body part 170a so that the holes 30 open into the recessed area 76. LED's 2 are respectively inserted into these through-holes 30.

In this embodiment, like in the first and second embodiments, the through-holes 30 are inclined by a prescribed angle θ toward the reflection plate 74 so that the inside opening ends of the through-holes 30 are located further toward the rear (or bottom) of the holder 70 than the outside opening ends. This arrangement of the through-holes is employed in order to increase the amount of the reflected light 4a which is reflected by the surface of the reflection plate 74 after being emitted from the LED's 2. The angle of inclination θ of the through-holes 30 is approximately 3 to 4 degrees. Accordingly, the LED's 2 are held in the through-holes 30 in a manner so that the LED's 2 are, as a result, inclined toward the rear (or bottom) by the angle θ. Thus, the optical axes L of the LED's 2 intersect the liquid crystal display panel 3 at the angle θ.

In order to increase the amount of the directly emitted light 4b directed toward the liquid crystal display panel 3, the through-holes 30 may be formed so that they are inclined toward the liquid crystal display panel 3 by a prescribed angle as in the third embodiment shown in FIG. 8. It goes without saying that it is also possible to form the through-holes 30 without any inclination. In this case, the through-holes 3 are parallel to the liquid crystal display panel 3.

As seen in FIG. 10, each one of the board-holders 170a and 170b has a front-side (or upper) light-blocking part 78 and a back-side (or lower) light-blocking part 79. These light-blocking parts face each other in the opening of the recessed areas 76. The light-blocking parts 78 and 79 cut off the light 4c which has a large emission angle among the light emitted from the LED's 2. Thus, glare is prevented, and the light-blocking parts 78 and 79 act to prevent such light from being emitted to the outside from the recessed areas 76.

The quantity of light 4c that is blocked is adjusted by varying the distance between the light-blocking parts 78 and 79 and the through-holes 30 or by varying the projecting dimensions of the light-blocking parts 78 and 79.

As shown in FIG. 10, vertical grooves 81 which hold the end portions of a printed circuit board 80 are respectively formed in the inside surfaces of the board-holding parts 170b and 170c formed on both ends of the main body part 170a of each one of the holder blocks 70A. These vertical grooves 81 are perpendicular to the axial lines of the through-holes 30.

Each holder block 70A is obtained from two (front and back or upper and bottom) block elements (with respect to the direction of thickness), which are joined into an integral unit to form the holder block. The reason for this two-piece structure is that the front-side (or upper) light-blocking part 78 and the back-side (or lower) light-blocking part 79 form undercuts at the time of molding and cannot be released from a mold when the holder blocks are intended to be made in a single piece.

The lead wires 35 of the LED's 2 are passed through lead wire through-holes (not shown) formed in the printed circuit board 80 and solder-connected to the electrical circuitry of the circuit board 80. The printed circuit board 80 is electrically connected to the printed circuit board 22 via connecting terminals 83. The rear (or lower) ends of these connecting terminals 83 are inserted into small holes 22 formed in the printing wiring board 22 and connected to the electrical circuitry of the wiring board 22 by solder 84.

The reflection plate 74 forms a reflective surface as a result of being subjected to a reflection treatment such as the application of a white paint, bonding of an aluminum foil, vacuum evaporation of aluminum or silver, etc. If necessary, the plate 74 can be a diffusing type reflective surface by the formation of minute indentations and projections.

The reflection plate 74 is fastened in place by being sandwiched between the casing 75 and the circuit board 22.

The conductive elements 72 are installed on the printed circuit board 22 along the edges of both longer sides of the reflection plate 74 and fastened to the front (or upper) surface of the printed circuit board 22 by the casing 75. In addition, a plurality of electrodes (not shown) are installed on the printed circuit board 22 along both longer sides of the printed circuit board 22 so as to positionally correspond to the electrodes (not shown) of the liquid crystal display panel 3. These electrodes are electrically connected via the conductive elements 72 and 73.

In this embodiment, a conductive rubber is used as the conductive elements 72. However, these electrical connections can be obtained via a lead frame or lead wires.

The light-diffusing plate 25 installed on the back surface of the liquid crystal display panel 3 can be formed by applying an opacifier to an acrylic resin, by embossing the surface of a transparent resin, by applying a transparent paint containing minute glass beads or metal particles to the surface of a transparent resin, or other method.

The casing 75 is obtained from a metal plate, a synthetic resin, etc. and has an opening 85 in the center. The casing 75 covers the LED's 2, the liquid crystal display panel 3, the conductive elements 72, the holder blocks 70A and the printed circuit board 80 and is fastened in a detachable fashion to the printed circuit board 22 by inserting engagement tongues 86 of the casing 75 into cut-outs 87 of the printed circuit board 22. With this cover 75, the liquid crystal display panel 3, the light-diffusing plate 25, the conductive elements 72 and the holder blocks 70A, etc. are secured between the casing 75 and the printed circuit board 22.

In this embodiment as well, as best shown in FIG. 10, the LED's 2 are inclined toward the reflection plate 74. Accordingly, light 4a which is reflected by the reflection plate 74 can be increased compared to the directly emitted light 4b so that more distant areas can be brightly illuminated. Furthermore, by using LED's 2 which have different directional angles as in the first through third embodiments, the light can be controlled precisely, and the brightness in various illumination areas can be made uniform. Moreover, among the light 4 emitted from the LED's 2, that light which constitutes glare light 4c which has a large emission angle and thus illuminates the display areas of the liquid crystal display panel 3 located closer to the LED's 2, is cut off by the front-side (or upper) light-blocking part 78 and by the back-side (lower) light-blocking part 79. Accordingly, the brightness of the display areas of the liquid crystal display panel 3 which are closest to the LED's 2 can be lowered, thus generating no glare. In addition, the brightness of the overall display part can be uniform, and the visibility is high.

Figure 11:
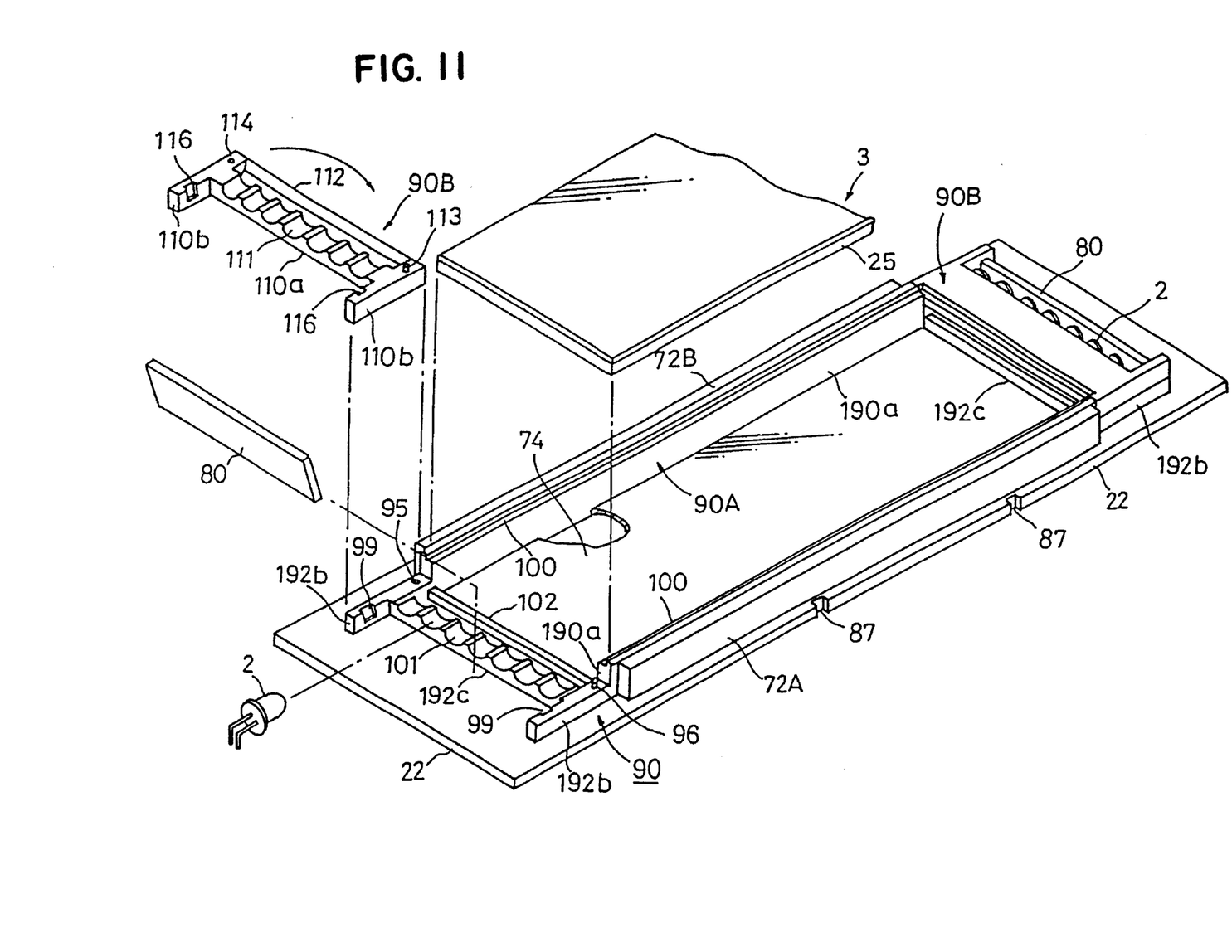
FIG. 11 is a partially cross-sectional exploded perspective view of a fifth embodiment of the present invention.

FIG. 11 illustrates a fifth embodiment of the present invention. In this embodiment, the holder 90 which holds the LED's 2 is an elongated frame-shape body and a reflective surface is formed by a reflection plate 74.

More specifically, the reflective surface of the reflection plate 74 is formed by the vacuum evaporation of aluminum, etc. The reflection plate 74 is installed by means of a bonding agent, etc. to the bottom of the holder 90. Alternatively, the reflection plate 74 can be provided on the printed circuit board 22.

The holder 90 consists of a holder frame 90A provided on the front (or upper) surface of the printed circuit board 22 and a pair of light source mount 90B which are detachable at both ends of the holder frame 90A.

The holder frame 90A is formed by molding an opaque white resin into an oblong square shape. The frame comprises a pair of parallel lateral frame element 190a, extensions 192b which extend from both ends of each of the lateral frame parts 190a, and a pair of longitudinal frame elements 192c which connect the extensions 192b of both lateral frame elements 190a to each other. The height of the extensions 192b is approximately a half of the height of the lateral frame elements 190a.

Small recesses 95 and projections 96 which are used for positioning the light source mounts 90B are respectively provided on the front (or upper) surfaces of the extensions 192b. Vertical grooves 99 which anchor both ends of a printed circuit board 80 that has LED's 2 are formed in the inside surfaces of the extensions 192b so as to be located outside of the longitudinal frame element 192c. The vertical grooves 99 open to the front (upper) surfaces of the extensions 192b. Furthermore, panel supports 100 which hold both longer side edges of the liquid crystal display panel 3 and the light-diffusing plate 25 are formed along the entire length of the inner surfaces of the lateral frame elements 192a.

The longitudinal frame elements 192c are obtained by molding the same resin materials that is used for the holder frame 90A into a plate form. The thickness of these longitudinal frame elements 192c is roughly equal to the height of the extensions 192b.

A plurality of semicircular recesses 101 are formed in the outside part of the front (or upper) surface of each longitudinal frame element 192c. The recesses 101 are formed side by side in the direction of the length of the longitudinal frame element 192c. A rear (or lower) light-blocking part 102 is projected to the front (or upwardly) on the inside part of the front (or upper) surface of each longitudinal frame element 192c as an integral part of the longitudinal frame element 192c. The light-blocking parts 102 and the recesses 101 are formed with a space in between.

Each of the light source retaining blocks 90B comprises a plate-form main body 110a which is obtained by molding the same resin used for the holder frame 90A and shaped into a "C" with a pair of arms 110b which are projected as an integral part of the main body 110a from the end portions of the main body 110a.

A plurality of semicircular recesses 111 are formed in the outside part of the back surface (top surface in the FIG. 11) of the main body 110a. These recesses 111 are provided so as to positionally correspond to the recesses 101 of the longitudinal frame element 192c. A front (or upper) light-blocking part 112 is provided on the inside part of the main body 110a as an integral part thereof. Furthermore, a projection 113 and a recess 114 are formed on the main body 110a at the both ends. They are provided so as to positionally correspond to the recess 95 and the projection 96 of the extensions 192b of the longitudinal frame element 192c. The recesses 111 and the light-blocking part 112 are formed with a space in between.

When each light source retaining block 90B is mounted (after turning from the posture shown in FIG. 11) to the extensions 192b by inserting the projection 113 into the recess 95 and fitting the recess 114 over the projection 96, the recesses 101 and 111 meet each other to form through-holes which act as a holding parts for the LED's 2.

Vertical grooves 116 which hold the edges of the printed circuit board 80 are formed in the inside surfaces of the arms 110b of the light source retaining block 90B so as to positionally correspond to the vertical grooves 99 of the extensions 192b of the lateral frame elements 190a. These vertical grooves 16 are formed so that they open to the back (or bottom) surfaces of the arms 110b.

Accordingly, when the light source retaining block 90B is mounted on the extensions 192b, the vertical grooves 116 connect in a straight line with the vertical grooves 99 and thus hold the edge portions of the printed circuit board 80. In this case, the printed circuit board 80 is inserted beforehand into either the vertical grooves 99 or the vertical grooves 116, and then the light source retaining block 90B is placed on the extensions 192b.

When each light source retaining block 90B is mounted on the extensions 192b, the front (or upper) light-blocking part 112 and the rear (lower) light-blocking part 102 face each other with a prescribed or predetermined space in between.

Otherwise, this embodiment is substantially the same as the fourth embodiment in structure.

In this structure as well, glare light with a large emission angle among the light emitted from the LED's 2 is cut off by the light-blocking parts 112 and 102. Accordingly, the same advantages as that of the fourth embodiment are obtained.

In each of the fourth and fifth embodiments, the holder has two light-blocking parts (the front or upper light-blocking part 78 or 112 and the rear or lower light-blocking part 79 or 102). However, the present invention is not limited to this structure. If the light-blocking effect can be obtained by one light-blocking part, the holder can have only one light-blocking part, which is the front (or upper) light-blocking part.

Various alterations and modifications are possible in the present invention. For example, the holder can be obtained by connecting a pair of holder blocks 70A shown in FIGS. 9 and 10 with a pair of lateral frame elements installed perpendicular to the holder blocks 70A.

Moreover, in the embodiments described above, the

LED's of green light are lit under ordinary conditions, and the LED's of red light are lit as a warning. However, it goes without saying that LED's emitting more than two different colors of light can be used.

In the liquid crystal display device of the present invention, as described above, an illuminating device which is installed on the back of a liquid crystal display panel is obtained from a shallow box-form holder that has a reflective bottom, a plurality of LED's which are installed in at least one of the shorter side walls of the holder, and a light-diffusing plate which is installed between the liquid crystal display panel and the holder, and the light emitted by the LED's is diffused by the light-diffusing plate so that the diffused light back-illuminates the liquid crystal display panel. Accordingly, the display element of the liquid crystal display panel is illuminated evenly for the entire surface.

Furthermore, in the present invention, at least two types of LED's which have different light directional angles are used, and these LED's are selected to be used for individual illumination areas. Accordingly, the brightness levels of various illumination areas are precisely controlled and adjusted. Thus, it is possible to obtain a surface light source with an uniform brightness. In addition, the brightness of the overall display element of the liquid crystal display panel can be uniform, and the irregularity in brightness is prevented.

Furthermore, in the present invention, the LED's are inclined by a prescribed angle toward the liquid crystal display panel or toward the reflective surface. Accordingly, the proportions of the directly emitted light (which directly illuminates the liquid crystal display after being emitted by the LED's) and the reflected light (which is reflected by the reflective surface) can be varied. With the LED's that are inclined toward the liquid crystal display panel, the light reflected by the reflective surface can travel a greater distance before being reflected. Conversely, with the LED's that are inclined toward the reflective surface, the amount of light reflected by the reflective surface can be increased. Thus, the brightness level of the illumination areas can be adjusted at a desired level.

In addition, since no light-conducting plate is used, the device of the present invention is light in weight. Thus, the present invention is especially suitable for use in compact liquid crystal display devices.

We claim:

1. A liquid crystal display device comprising a holder with a front surface thereof open, a liquid crystal display panel installed in said front-surface opening of said holder with a light-diffusing plate interposed between said holder and said display panel, a printed circuit board, and a plurality of LED's coupled to said printed circuit board so as to back-illuminate said liquid crystal display panel from behind said light-diffusing plate, said holder further comprising: holding parts for holding said LED's; a reflective surface formed on an inside bottom surface of said holder; and wherein said light-diffusing plate is back-illuminated by a direct light emitted from said LED's and a light reflected by said reflective surface, and said LED's are at least two types of LED's having different light directional angles.

2. A liquid crystal display device according to claim 1, wherein said LED's are at least two types of LED's which emit different colors of light.

3. A liquid crystal display device according to claim 2, wherein said holding parts which hold said LED's includes a plurality of through-holes which are formed through at least one side wall of said holder so that respective axial lines of said through-holes are inclined toward said light-diffusing plate or toward said reflective surface.

4. A liquid crystal display device according to claim 2, wherein a hill-shaped raised portion which has said reflective surface is provided in a center of said inside bottom surface of said holder.

5. A liquid crystal display device according to claim 1, wherein said holding parts which hold said LED's include a plurality of through-holes which are formed through at least one side wall of said holder so that respective axial lines of said through-holes are inclined toward said light-diffusing plate or toward said reflective surface.

6. A liquid crystal display device according to claim 5, wherein a hill-shaped raised portion which has said reflective surface is provided in a center of said inside bottom surface of said holder.

7. A liquid crystal display device according to claim 1, wherein a hill-shaped raised portion which has said reflective surface is provided in a center of said inside bottom surface of said holder.

8. A liquid crystal display device comprising a holder with a front-surface thereof open, a liquid crystal display panel installed in said front-surface opening of said holder with a light-diffusing plate interposed between said holder and said display panel, a printed circuit board, a plurality of LED's coupled to said printed circuit board so as to back illuminate said liquid crystal display panel from behind said light-diffusing plate, said holder further comprising: holding parts for holding said LED's; a reflective surface formed on an inside bottom surface of said holder; a hill-shaped raised portion which has said reflective surface provided at a center of said inside bottom surface of said holder; and wherein said-light-diffusing plate is back illuminated by a direct light emitted from said LED's and a light reflective by said reflected surface, and said LED's are at least two types of LED's which emit different colors of light.

9. A liquid crystal display device comprising a holder with a front-surface thereof open, a liquid crystal display panel installed in said front-surface opening of said holder with a light-diffusing plate interposed between said holder and said display panel, a printed circuit board, a plurality of LED's coupled to said printed circuit board so as to back illuminate said liquid crystal display panel from behind said light diffusing plate, said holder further comprising: holder parts for holding said LED's; a reflective surface formed on an inside bottom surface of said holder; a hill-shaped raised portion which has said reflective surfaces provided in a center of said inside bottom surface of said holder; and wherein said light-diffusing plate is back illuminated by a direct light emitted from said LED's and a light reflected by said reflective surface, and said holder parts which hold said LED's include a plurality of through holes which are formed at least in one side wall of said holder so that respective axial lines of said through holes are inclined toward said light-diffusing plate or toward said reflective surface.

10. A liquid crystal display device comprising a holder with a front surface thereof open, a liquid crystal display panel installed in said front-surface opening of said holder with a light-diffusing plate interposed between said holder and said display panel, a printed circuit board, a plurality of LED's coupled to said printed circuit board so as to back illuminate said liquid crystal display panel from behind said light diffusing plate, said holder further comprising: holder parts for holding said LED's; a reflective surface formed on an inside bottom surface of said holder; a hill-shaped raised portion which has said reflective surfaces provided in a center of said inside bottom surface of said holder; and wherein said light-diffusing plate is back illuminated by a direct light emitted from said LED's and a light reflected by said reflective surface.

* * * * *